(12) United States Patent
Sheng

(10) Patent No.: US 7,535,604 B2
(45) Date of Patent: May 19, 2009

(54) BOOK SCANNER WITH A UNIFORM LIGHT SOURCE

(75) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 526 days.

(21) Appl. No.: 11/118,940

(22) Filed: Apr. 29, 2005

(65) Prior Publication Data

US 2005/0243386 A1   Nov. 3, 2005

(30) Foreign Application Priority Data

Apr. 30, 2004  (TW) .............................. 93206784 U

(51) Int. Cl.
*H04N 1/04* (2006.01)
(52) U.S. Cl. ...................... 358/475; 358/497; 358/474; 399/362; 399/379; 399/380
(58) Field of Classification Search ................ 358/497, 358/494, 484, 474, 475, 509, 505; 382/312, 382/318, 319; 355/25, 75; 250/234–236, 250/216, 239; 399/211, 212, 362, 379, 380; 362/551, 98
See application file for complete search history.

(56) References Cited

U.S. PATENT DOCUMENTS

| | | | | |
|---|---|---|---|---|
| 5,359,207 A | * | 10/1994 | Turner | ......................... 257/81 |
| 5,475,505 A | * | 12/1995 | Minasian et al. | ............. 358/474 |
| 5,619,302 A | * | 4/1997 | Wu | .............................. 355/25 |
| 5,636,006 A | * | 6/1997 | Wu | .............................. 355/75 |
| 5,746,505 A | * | 5/1998 | Hirobe et al. | ................ 362/260 |
| 5,847,846 A | * | 12/1998 | Wu et al. | ..................... 358/475 |
| 7,268,923 B2 | * | 9/2007 | Schroath et al. | ............. 358/474 |
| 2002/0191994 A1 | * | 12/2002 | Lee | ............................ 399/362 |
| 2006/0152773 A1 | * | 7/2006 | Wu | .............................. 358/474 |
| 2007/0019253 A1 | * | 1/2007 | Huang | ......................... 358/474 |

\* cited by examiner

*Primary Examiner*—Cheukfan Lee

(57) ABSTRACT

A book scanner comprises a transparent platen, a carriage and a housing. The carriage is disposed in the housing, and the transparent platen with an angular structure is disposed on the housing for an original placed to be scanned. The carriage has a strip-shaped light tube disposed corresponding to the transparent platen. The part of the light source that has the highest luminance is disposed in the position farthest away from the transparent platen, while the part of the light source that has the lower luminance is disposed in the position closer to the transparent platen to assure a uniform and stable luminous intensity of light on each scan line when the light source illuminates the original.

13 Claims, 7 Drawing Sheets

BOOK SCANNER WITH A UNIFORM LIGHT SOURCE

BACKGROUND OF THE INVENTION

1. Field of the Invention

The present invention related generally to a light source structure and a scanning window structure of a scanner, and more particularly to a structure of a uniform light source for a book scanner. The scanning window has an angled structure so that two adjacent pages of a book may be placed closely onto the scanning window when the book is open. The light source is strip-shaped light source that moves along the crest line of the scanning window to provide uniform light required to scan the book.

2. Description of the Prior Art

Conventional scanners comprise a housing, a scanning window, a carriage module, and a light source. The scanning window is disposed on the top of the housing, the carriage module is disposed moveably in the housing, and the light source is disposed on the carriage module and opposite to the scanning window. The light from the light source penetrates the scanning window and illuminates the sheet to be scanned on the scanning window.

The light source is a strip-shaped tubular light source. Theoretically illumination on each scan line at each position of the surface of a sheet is same when a light source is disposed in parallel to a flat scanning window. However, practically, the luminous intensity at both ends of a tubular light source is less than the luminous intensity in the middle thereof, and the luminous intensity is more uniform in the area approaching the middle part of the light tube.

As FIG. 6 shows, one end of the light tube is defined section A and the other end of the light tube is defined section C, and the middle portion of the light tube is defined section B. The luminous intensity variation of Section A and Section C are much greater than the Section B. It means that the luminous intensity of the two ends of the light tube is uneven. For a scanner with an uneven light source, compensation will be provided for a carriage module to calibrate the image sensing signal. (Refer to FIG. 6 for ideal intensity calibration curve.) However, the difference between the actual luminous intensity and desired calibrated intensity of the light source becomes greater when the entire light tube is used as the light source, even greater than the effective compensation of the light source in the scanner. In FIG. 6, L stands for the actual maximum intensity of the light source, while L1 is the difference between the ideal calibrated intensity and the actual maximum intensity of the light source. When $L1/L/\frac{1}{3}$, or even $L1/L/\frac{1}{2}$, the calibration result of the carriage module is not to meet the requirement with the current light source compensation of the scanner. In the circumstances, the scan image corresponding to both ends of the light source is vague or incorrect and, thus, does not meet the requirements for high image quality.

Images of poor scan quality brought by low and unstable luminous intensity at the two ends of the light source occurs especially for book scanners. In FIG. 1, the book scanner 10 includes a housing 12 and a scanning window 14. The scanning window 14 with an angular structure is disposed on the housing 12. A carriage 15 with two sets of scanning modules 16 moving reciprocatingly is disposed in the housing 12. The scanning window 14 has two light transmission parts 142 and 144 so that two adjacent pages of a book 18 may be placed closely onto the surface of the light transmission parts 142 and 144 when the book is open. Each scanning module 16 is disposed under the light transmission part 142 or 144, and the scanning module 16 is parallel to the light transmission part 142 or 144. The scanning module 16 includes two reflective mirrors 162 and 163, a lens 164, a image sensor 166, and a light source 168.

As shown in FIG. 1, the light from each light source 168 illuminates the binding section 182 of the book 18. Since the luminance of both ends of the light source 168 is low and unstable, the scan images produced at the binding section 182 of the book 18 and at the edge thereof are blurred or incorrect.

SUMMARY OF THE INVENTION

To solve the problem of vagueness or incorrectness of the scan images at the binding side and at the edge of the book due to the corresponding configuration of the light source and the scanning window of the book scanner of the prior art, the present invention provides an innovative light source and a scanning window configuration that is especially applicable to a book scanner comprising a scanning window with an angular structure.

The objective of the present invention is to provide a light source and a scanning window with an angular structure for a book scanner. The scanning window is assembled on the top surface of a housing of the book scanner. A movable carriage module is assembled in the housing and has at least a strip-shaped tubular light source. The middle part of the light source is in alignment with the crest line of the scanning window and the two ends of the light source exceed the edge of the scan area.

With the aforementioned structure, the part of the light source that has the highest luminance is disposed at the position farthest away from the book placed on the scanning window, while the part of the light source that has the lower luminance is disposed at the position closer to the book. This configuration assures a uniform scan line intensity reflected by the page of the book to be scanned and produces a clear and correct scan image.

DETAILED DESCRIPTION OF THE INVENTION

Figure 1:
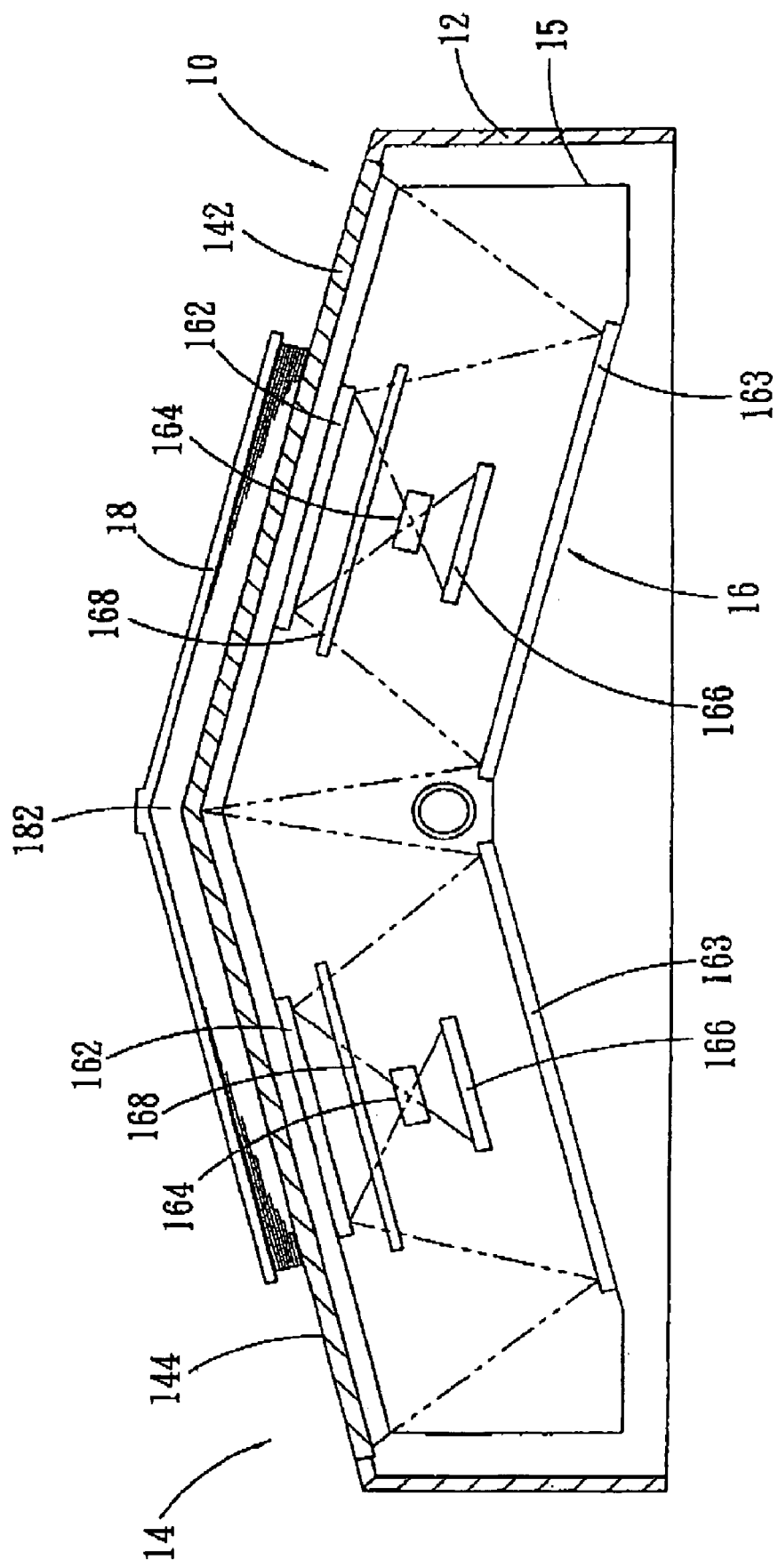
FIG. 1 is a schematic view showing a structure of a book scanner of the prior art.
Figure 2:
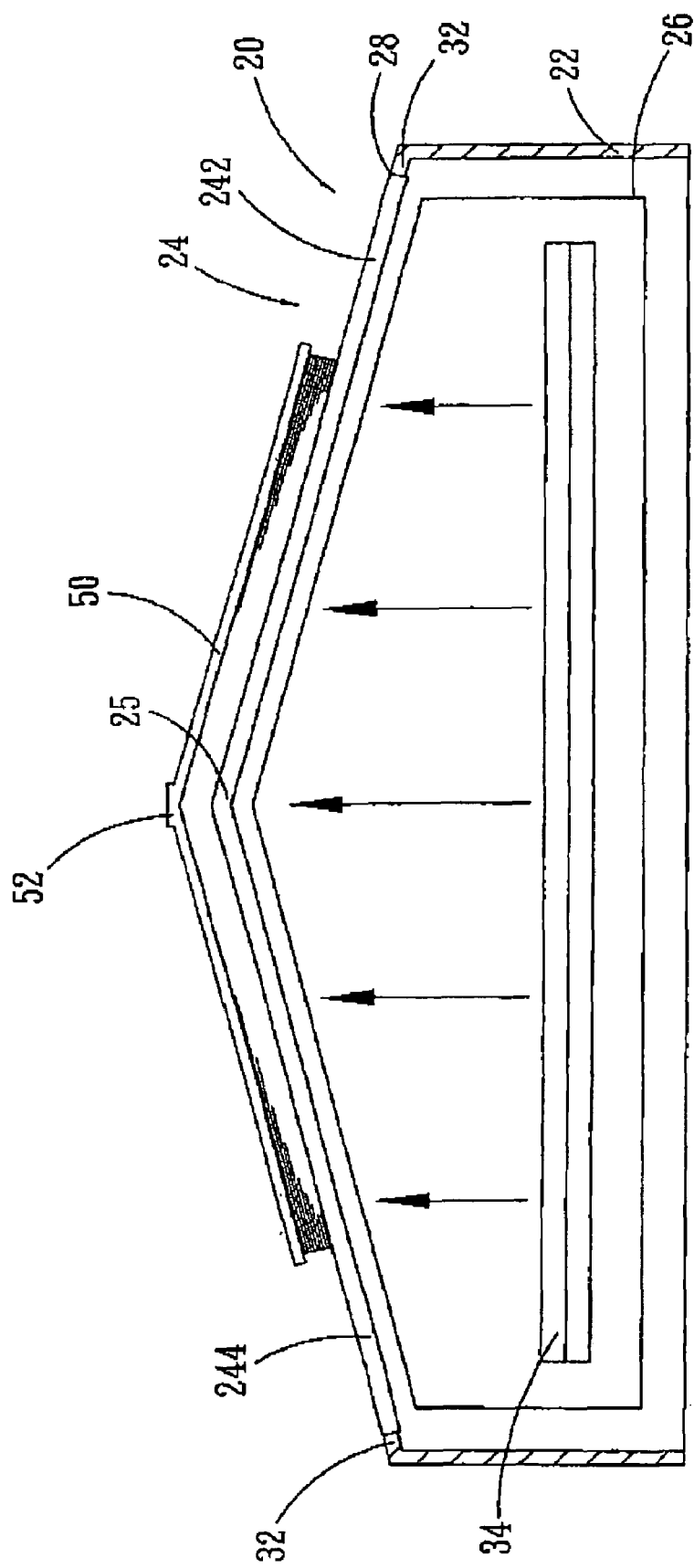
FIG. 2 is a schematic view showing a structure of the present invention.

In FIG. 2, a book scanner 20 has a housing 22, a glass 24 and a carriage 26. An opening 28 is formed on the top surface of the housing 22 and a frame surface 32 is formed around the opening 28. The glass 24 is mounted on the opening 28 and has an angular structure so that two adjacent pages of a book 50 may be placed closely onto the surface of the glass 24 when the book is open. The carriage 26 is moveably assembled in the housing 22 and positioned corresponding to the glass 24. The carriage 26 comprises two sets of scanning modules (not shown in the figure) and a light source 34.

Figure 3:
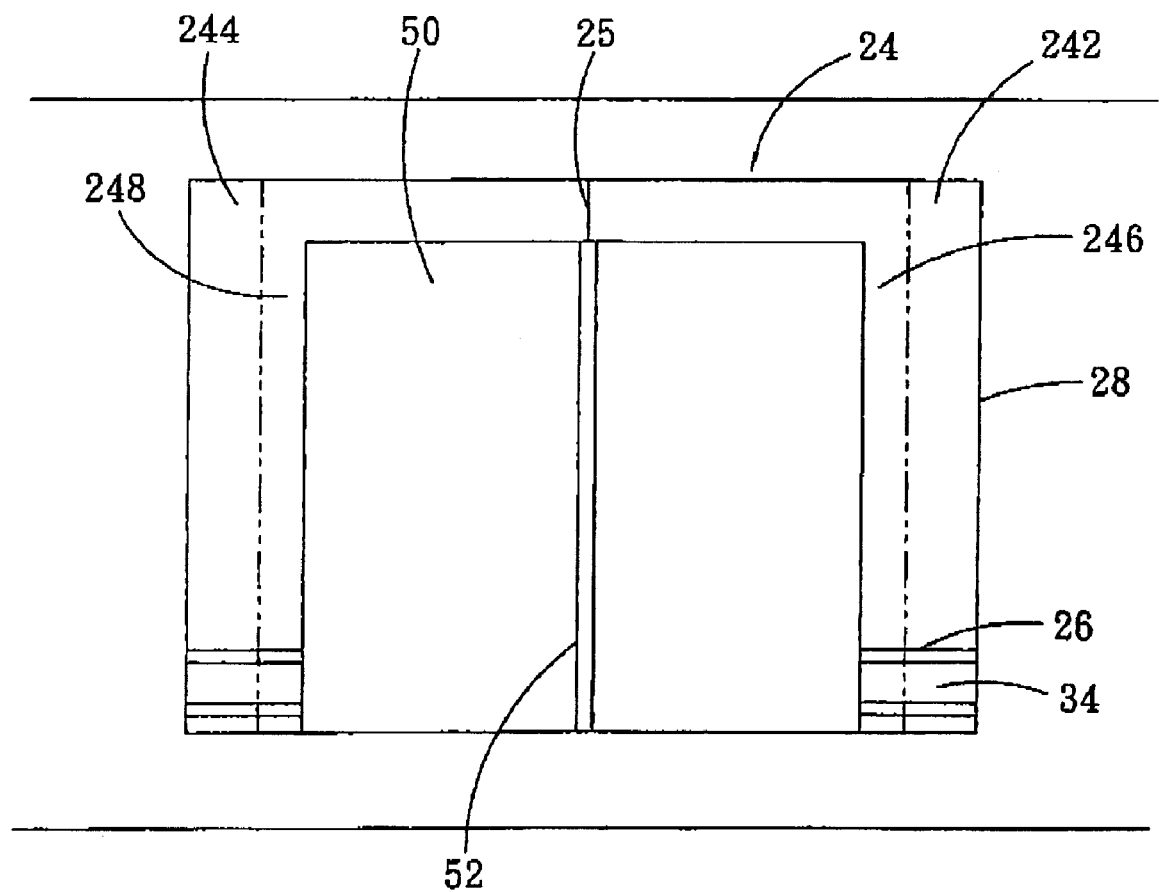
FIG. 3 is a schematic view showing another structure of the present invention.

As shown in FIGS. 2 and 3, the glass 24 has a first light transmission part 242 and a second light transmission part 244. The first light transmission part 242 and the second light transmission part 244 are configured adjacently to form an angular structure and, thus, a crest line 25 is formed along the joint of the first light transmission part 242 and the second light transmission part 244.

The first light transmission part 242 has a scan area 246 (i.e. the area defined by the dotted line, which does not exist actually) and a distance is reserved from the boundary of the scan area 246 to the inner side of the opening 28. Similarly, the second light transmission part 244 has another scan area 248 and a distance is reserved from the boundary of the scan area 248 to the inner side of the opening 28.

The scan area 246 and 248 is configured corresponding to the page size of the book 50. For example, an open book 50 with a page size smaller than A4 can be placed within the scan areas 246 and 248 with an A4 scanning size. To achieve this objective, the first light transmission part 242 and the second light transmission part 244 are designed slightly larger than A4. When a book with a larger page size is to be scanned, a book scanner with a larger scan area is required to ensure that the book page is within the scan area. The common solution for scanning different sizes (e.g. A4 or A3 size) of documents is to use different book scanners with different specifications.

Figure 4:
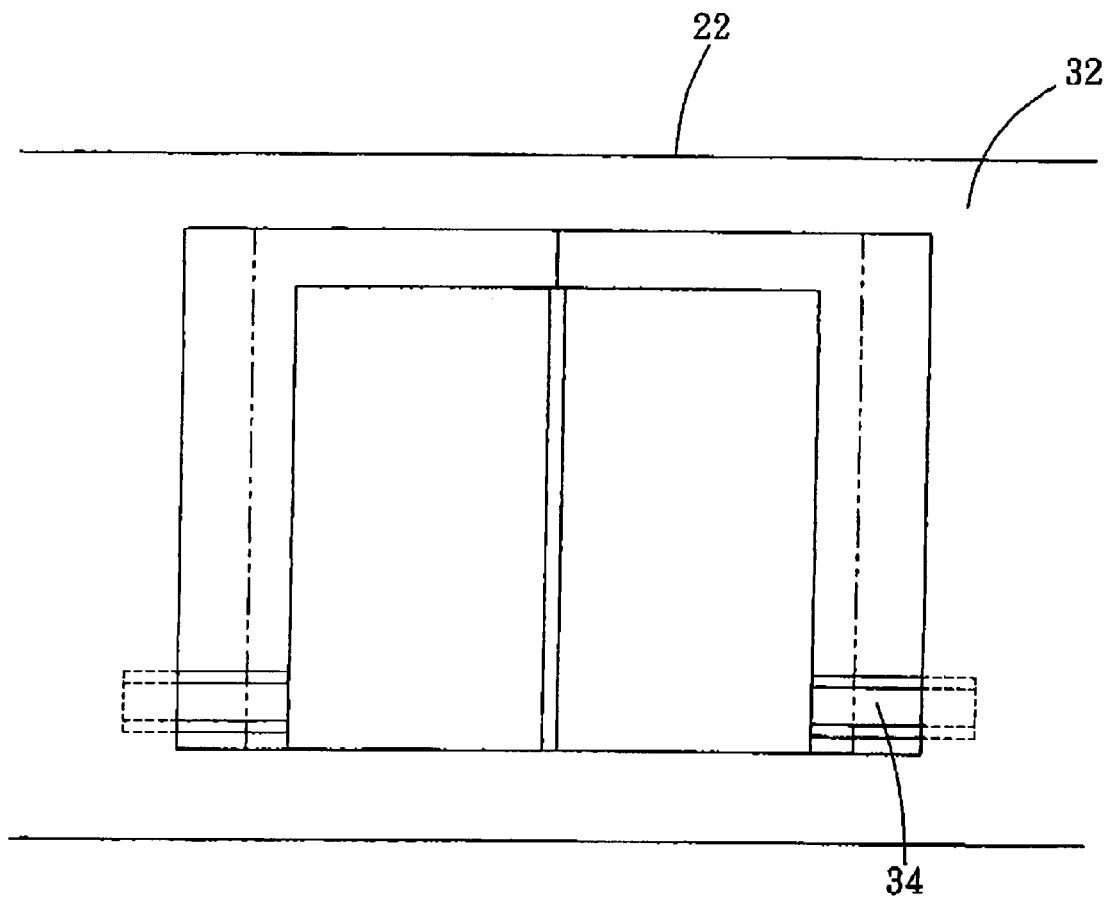
FIG. 4 is a schematic view showing a third structure of the present invention.

A strip-shaped light tube is used as the light source 34, which is lengthwise perpendicular to the crest line 25 and moves in parallel to the extending direction of the crest line 25. Since the lengthwise direction of the light source 34 is perpendicular to its moving direction, the middle part of the light source 34 is positioned corresponding to the crest line 25 of the glass window 24. The light source 34 is designed with two ends positioned outside the boundary of the scan areas 246 and 248 and disposed correspondingly under the frame surface 32 formed on the top surface of the housing 22 as shown in FIG. 4.

Further as shown in FIGS. 2 and 3, when the book 50 is scanned, the binding section 52 of the book 50 is placed on the crest line 25 of the glass 24 and the adjacent pages of the book 50 are placed closely onto the surface of the first light transmission part 242 and the second light transmission part 244 within the scan areas 246 and 248.

As shown in FIG. 2, when the light source 34 radiates light for scanning, the distance from the middle part of the light source 34 to the crest line 25 is greater than the distance from any other parts of the light source 34 to the glass window 24. In other words, the distance from the part of the light source 34 that has the highest luminous intensity to the book 50 is greater than the distance from the part of the light source 34 that has the lower luminous intensity to the book 50. According to the inverse square law, the image produced when the light source 34 illuminates the book 50 has even luminance on every part thereof and the problem that the luminance in the middle part of a scan line is greater than the luminance at both ends thereof is, thus, solved.

Figure 7:
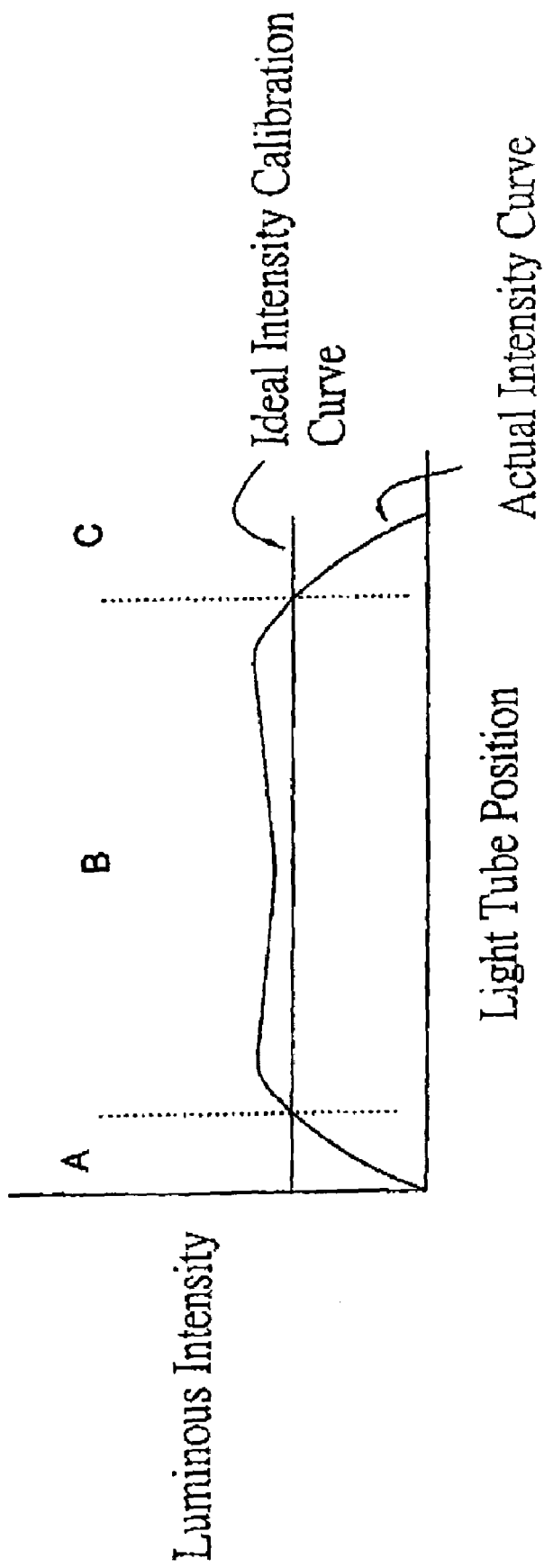
FIG. 7 is a schematic view showing the luminous intensity of individual light tube sections after calibration.

FIG. 7 shows the correlation of the luminous intensity to corresponding parts of the light source when the strip-shaped light tube in FIG. 2 is disposed in the book scanner. As shown in FIG. 7, the difference between the ideal calibrated intensity and the actual maximum intensity of the light source is controlled within ⅓ to ½ of the actual maximum intensity, i.e. within the pre-set effective compensation of the scanner.

Instead of the parallel configuration of the light source and light transmission part as in the prior art, the present invention uses a single strip-shaped light tube as a light source that is disposed under the glass 24 which has an angular structure. The part of the light source 34 that has the highest luminous intensity is positioned farthest away from the book 50, while the part of the light source 34 that has the lower luminous intensity is positioned closer to the book 50. Consequently, a uniform luminous intensity on a scan line of the pages of the open book 50 when the light source 34 illuminates the surface of the pages is guaranteed with this design. Moreover, the parts at both ends of the light source 34 that have the most unstable and lowest luminous intensity is outside the scan areas 246 and 248 to improve the stability and evenness of the luminance on each scan line of the page.

Figure 5:
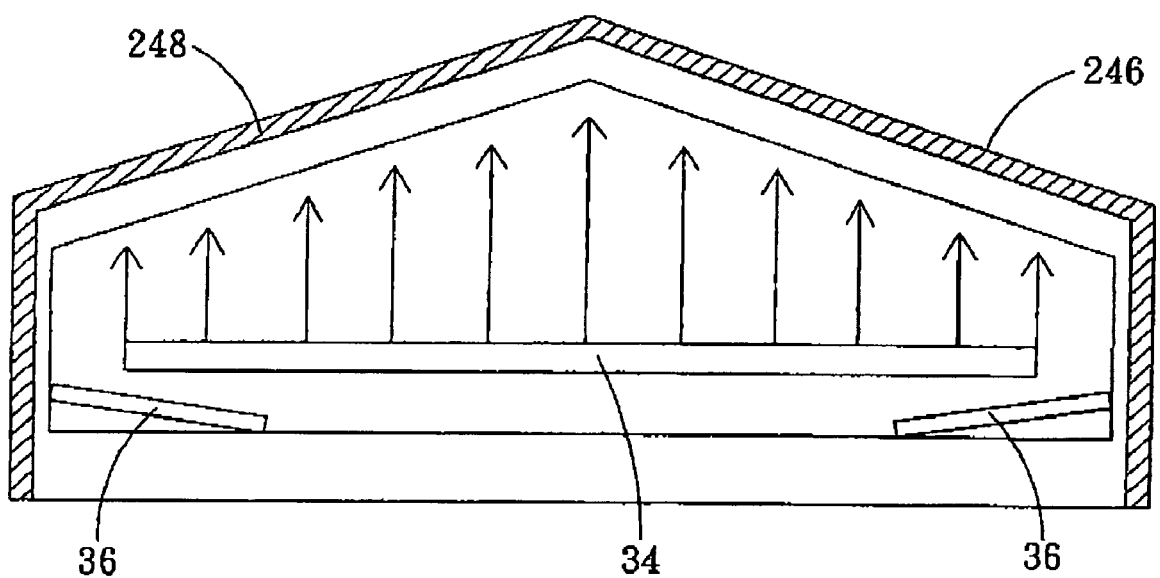
FIG. 5 is a schematic view showing another embodiment of the present invention.
Figure 6:
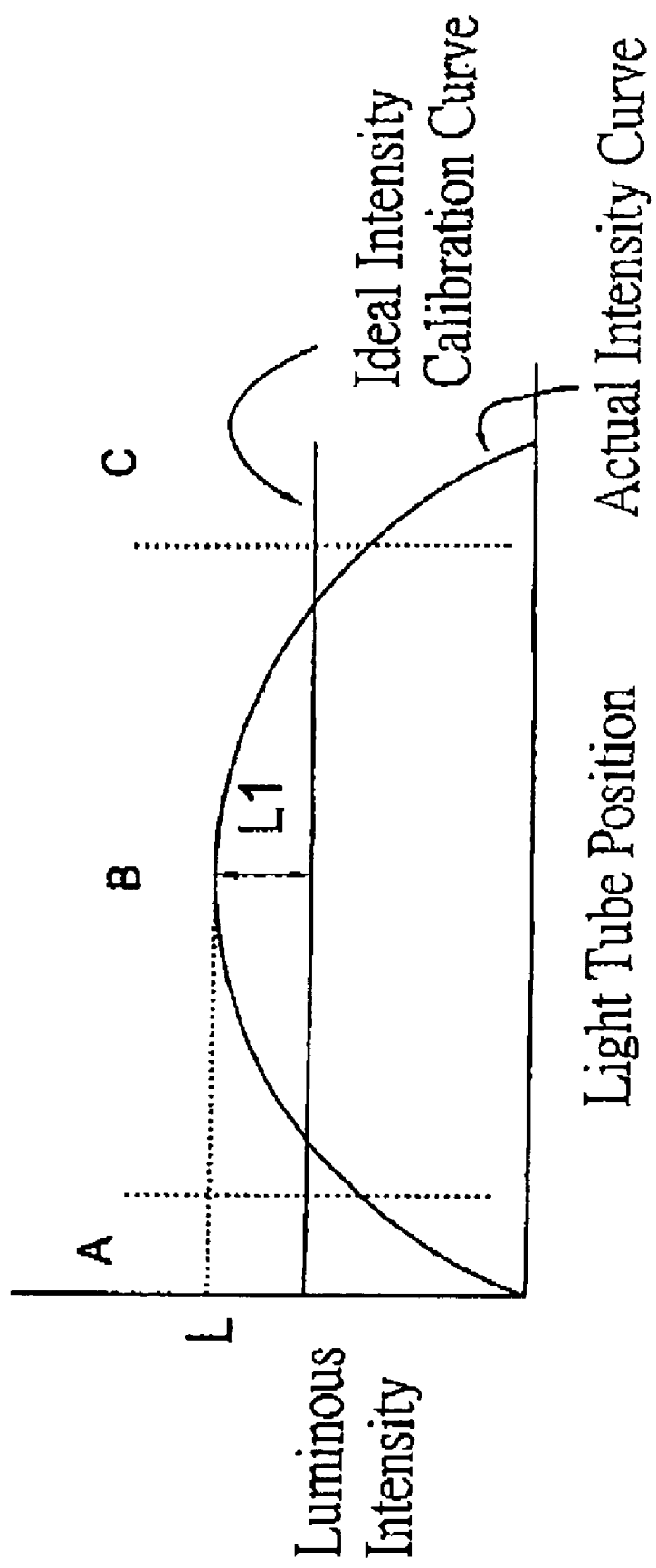
FIG. 6 is a schematic view showing the luminous intensity of individual light tube sections before calibration.

Another embodiment of the present invention shown in FIG. 5 has a light source 34 with a light reflection component 36 at each end thereof to improve luminous intensity. With this design, the illumination range of the light source 34 is increased and extension of the light source 34 to its lengthwise direction beyond the scan areas 246 and 248 is not required any more. Technologies for increase the luminous intensity at both ends of a strip-shaped light source, such as coating the areas approaching both ends of the light source with material of high reflection coefficient or bending both ends of the light source, is applicable to the present invention. The above disclosure is not intended as limiting. Those skilled in the art will readily observe that numerous modifications and alteration of the device may be made while retaining the teachings of the invention. Accordingly, the above disclosure should be construed as limiting only by the metes and bounds of the appended claims.

What is claimed is:

1. A book scanner, comprising:
a housing;
a carriage moving in reciprocating motion in said housing, wherein an original is placed on said book scanner and scanned with a scanning module disposed in said carriage;
a transparent platen disposed on a top of said housing, wherein said original is placed onto said transparent platen; and
a light source having a substantially strip-shaped light tube disposed in said carriage and corresponding to said transparent platen, wherein a light beam from said light source transmits through said transparent platen and illuminates said original,
wherein said transparent platen comprises a first light transmission part and a second light transmission part, both said first and second light transmission parts are configured adjacently to form an angular structure, a crest line is formed along a joint of said first and second light transmission parts, and said strip-shaped light tube is lengthwise perpendicular to said crest line, a scan area is defined on each of said first light transmission part and said second light transmission part, said original is placed within said scan areas, two ends of said light source exceed a boundary of said scan area for each of said first light transmission part and said second light transmission part.

2. The book scanner according to claim 1, wherein an opening is formed in said housing for mounting said transparent platen, a distance is reserved from said boundary of said scan area of said first light transmission part and said second light transmission part to an inner edge of said opening, and said two ends of said light source are located between said boundary of said scan area and said inner edge of said opening.

3. The book scanner according to claim 1, wherein an opening is formed in said housing for mounting said transparent platen, a frame surface is formed around said opening, and said two ends of said light source are disposed correspondingly under said frame surface.

4. The book scanner according to claim 1, wherein one light reflection component is disposed at each of said two ends of said light source to reflect said light beam from said two ends of said light source to said transparent platen.

5. The book scanner according to claim 1, wherein a bending part is disposed at each of said two ends of said light source.

6. The book scanner according to claim 1, wherein a part of said light source which has the highest luminance is disposed at a position farthest away from said original placed on said transparent platen, while a part of said light source which has the lower luminance is disposed at a position closer to said original.

7. A book scanner, comprising:
a housing;
a carriage moving in reciprocating motion in said housing, wherein an original is placed on said book scanner and scanned with a scanning module disposed in said carriage;
a transparent platen disposed on a top of said housing, wherein said original is placed onto said transparent platen; and
a light source having a substantially strip-shaped light tube disposed in said carriage and corresponding to said transparent platen, wherein a light beam from said light source transmits through said transparent platen and illuminates said original,
wherein said transparent platen comprises a first light transmission part and a second light transmission part, both said first and second light transmission parts are configured adjacently to form an angular structure, a crest line is formed along a joint of said first and second light transmission parts, said strip-shaped light tube is lengthwise perpendicular to said crest line, an opening is formed in said housing for mounting said transparent platen, a frame surface is formed around said opening, and two ends of said light source are disposed correspondingly under said frame surface.

8. The book scanner according to claim 7, wherein one light reflection component is disposed at each of said two ends of said light source to reflect said light beam from said two ends of said light source to said transparent platen.

9. The book scanner according to claim 7, wherein a bending part is disposed at each of said two ends of said light source.

10. The book scanner according to claim 7, wherein a part of said light source which has the highest luminance is disposed at a position farthest away from said original placed on said transparent platen, while a part of said light source which has the lower luminance is disposed at a position closer to said original.

11. A book scanner, comprising:
a housing;
a carriage moving in reciprocating motion in said housing, wherein an original is placed on said book scanner and scanned with a scanning module disposed in said carriage;
a transparent platen disposed on a top of said housing, wherein said original is placed onto said transparent platen; and
a light source having a substantially strip-shaped light tube disposed in said carriage and corresponding to said transparent platen, wherein a light beam from said light source transmits through said transparent platen and illuminates said original,
wherein said transparent platen comprises a first light transmission part and a second light transmission part, both said first and second light transmission parts are configured adjacently to form an angular structure, a crest line is formed along a joint of said first and second light transmission parts, said strip-shaped light tube is lengthwise perpendicular to said crest line, a part of said light source which has the highest luminance is disposed at a position farthest away from said original placed on said transparent platen, while a part of said light source which has the lower luminance is disposed at a position closer to said original.

12. The book scanner according to claim 11, wherein one light reflection component is disposed at each of two ends of said light source to reflect said light beam from said two ends of said light source to said transparent platen.

13. The book scanner according to claim 11, wherein a bending part is disposed at each of two ends of said light source.

* * * * *